(12) United States Patent
Flickinger et al.

(10) Patent No.: US 9,615,509 B2
(45) Date of Patent: Apr. 11, 2017

(54) HARVESTER GRAIN TANK HAVING ACTIVE CONVEYING SYSTEM

(75) Inventors: Wayne T. Flickinger, Oxford, PA (US); Nathan E. Isaac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 383 days.

(21) Appl. No.: 13/050,326

(22) Filed: Mar. 17, 2011

(65) Prior Publication Data

US 2012/0237325 A1     Sep. 20, 2012

(51) Int. Cl.
*B60P 1/42*       (2006.01)
*A01D 41/12*     (2006.01)

(52) U.S. Cl.
CPC ................ *A01D 41/1217* (2013.01)

(58) Field of Classification Search
CPC ........... B60P 1/40; B60P 1/42; A01D 41/1217
USPC .................. 414/502–505, 526–528
See application file for complete search history.

(56) References Cited

U.S. PATENT DOCUMENTS

| | | | |
|---|---|---|---|
| 3,265,226 A * | 8/1966 | Malcolm | 414/502 |
| 4,206,581 A | 6/1980 | Haake et al. | |
| 4,739,774 A | 4/1988 | Heidjann | |
| 4,846,198 A | 7/1989 | Carnewal et al. | |
| 5,364,223 A * | 11/1994 | Bissex | 414/526 |
| 5,443,352 A * | 8/1995 | Schuhmacher | 414/526 |
| 5,772,389 A * | 6/1998 | Feller | 414/489 |
| 5,857,907 A | 1/1999 | Underwood | |
| 5,865,592 A * | 2/1999 | Hansen | 414/502 |
| 6,390,915 B2 | 5/2002 | Brantley et al. | |
| 7,040,980 B1 * | 5/2006 | Kestel | 460/114 |
| 7,093,707 B2 | 8/2006 | Matousek et al. | |
| 7,681,383 B2 | 3/2010 | Argetsinger et al. | |
| 2010/0290878 A1 * | 11/2010 | Ricketts | 414/505 |

FOREIGN PATENT DOCUMENTS

| | | | |
|---|---|---|---|
| JP | 54064377 A | 5/1979 | |
| JP | 05146217 A | 6/1993 | |
| JP | 05252826 A | 10/1993 | |
| JP | 06327346 A | 11/1994 | |
| JP | 2002045030 A | 2/2002 | |
| JP | 2007202493 A | 8/2007 | |

* cited by examiner

*Primary Examiner* — Jonathan Snelting
(74) *Attorney, Agent, or Firm* — Patrick M. Sheldrake

(57) ABSTRACT

A grain tank includes a generally flat bottom that is oriented at a position that is less than the angle of repose of the grain. A conveyor mechanism conveys grain along the bottom to a cross auger for unloading. One or more sensors may be placed in the grain tank to determine a state of the grain to further determine if the conveyor mechanism should be operated to unload grain from the grain tank.

10 Claims, 6 Drawing Sheets

HARVESTER GRAIN TANK HAVING ACTIVE CONVEYING SYSTEM

TECHNOLOGY FIELD

The present invention relates generally to grain tanks for use with a harvester, such as a combine harvester, and more particularly to methods and systems to evacuate grain or other crop within the grain tank during unloading.

BACKGROUND

A combine harvester is a machine that is used to harvest grain crops. The objective is to complete several processes, which traditionally were distinct, in one pass of the machine over a particular part of the field. Among the crops that may be harvested with a combine are wheat, oats, rye, barley, corn, soybeans, flax or linseed, and others. The waste (e.g., straw) discharged on the field includes the remaining dried stems and leaves of the crop which may be, for example, chopped and spread on the field as residue or baled for feed and bedding for livestock.

A combine harvester cuts crop using a wide cutting header. The cut crop may be picked up and fed into the threshing and separating mechanism of the combine, typically consisting of a rotating threshing rotor or cylinder to which grooved steel bars commonly referred to as rasp bars or threshing elements may be bolted. These rasp bars thresh and aid in separating the grains from the chaff and straw through the action of the drum against the concaves, i.e., shaped "half drum," that may also be fitted with steel bars and a meshed grill, through which grain, chaff and smaller debris may fall, whereas the straw, being too big or long, is carried through to the outlet. The chaff, straw, and other undesired material are returned to the field via a spreader mechanism.

In an axial flow combine, this threshing and separating system serves a primary separation function. The harvested crop is threshed and separated as it is conveyed between a longitudinally arranged rotor and the inner surface of an associated chamber comprising threshing and separating concaves, and a rotor cage or cover. The cut crop material spirals and is conveyed along a helical path along the inner surface of the chamber until substantially only larger residue remains. When the residue reaches the end of the threshing drum, it is expelled out of the rear of the combine. Meanwhile, the grain, chaff, and other small debris fall through the concaves and grates onto a cleaning device or shoe. For ease of reference, this smaller particulate crop material that contains the grain and chaff is referred to as threshed crop. The grain still needs to be further separated from the chaff by way of a winnowing process.

Clean grain is separated out of the threshed crop be way of a flat oscillating cleaning system that can include a chaffer and sieves. Generally, the cleaning system operates by mechanical and pneumatic methods; blowing air through the threshed crop to winnow the chaff and then sieving the grain to separate the grain from other particulates. Clean grain that is separated from residue via the sieves is typically transported to a grain tank in the combine for temporary storage. The grain tank is typically located atop the combine and loaded via a conveyer that carries clean grain collected in the cleaning system to the grain tank.

The conventional grain tank is arranged such that grain conveyed from the cleaning system fills the tank while inclines in the tank floor allow the grain to be gravity-fed into a transversely-oriented cross auger. By virtue of gravity feed and cross auger, grain may be distributed to a single point in the grain tank, such that another conveying system can offload the grain from the grain tank. Offloading the grain is typically implemented in one of either two conveying systems. One type of offload system is a turret style system. The turret style system incorporates a vertical auger within a vertical tube. At the top of the vertical tube, an unload tube, which may include a horizontal auger, connects and pivots coextensive with the vertical tube. A long-top unload tube may be used during the harvest to unload grain to a support trailer or vehicle. The other offload system is a swivel system. The swivel system incorporates an unloading auger attached to the cross auger, angled upward from the vehicle and pivots at the side of the vehicle to offload grain. The grain in a swivel system may too collect in a support trailer or vehicle. Both systems allow large quantities of grain to be offloaded in the field without needing to stop harvesting when the grain tank fills.

In some harvests, the combine harvester will harvest grain with a support trailer or truck, which may be driven alongside. Because the typical grain tank is small compared to the size of the harvest, grain that collects temporarily in the grain tank must be conveyed to the supporting truck or trailer. The distance between the grain tank in a supporting trailer or vehicle determines the necessary length of the unload tube. For safety reasons, the supporting vehicle should not be too close to the combine during the harvest. For example, where a supporting vehicle is traveling alongside the combine, the distance between the combine and the supporting vehicle should be greater than the distance that a cutting header of the combine extends laterally from the combine. As wider cutting headers are used, longer unload tubes become necessary.

Often it is desirable to have a large grain tank. For example, when a combine is operated without a support vehicle or where a combine is temporarily separated from a support vehicle, it is desirable to allow the combine to continue harvesting and loading the grain into the grain tank. One problem with the conventional gravity fed grain tank is that the geometry of the grain tank is limited and defined by the angle of repose of the grain being collected—that is, the minimum angle of the tank floor from horizontal needed to overcome internal friction and the natural ability of grain to form a mound. The conventional grain tank cannot have a substantially flat tank floor, because grain will not be conveyed by gravity to the cross auger for unloading. Instead, a conventional grain tank floor must be substantially inclined on either side of the cross auger (e.g. fore and aft side walls). The amount of inclination needed is determined by the properties of the grain and specifically its angle of repose. Because the angle of repose is relatively steep, it can be difficult to fit a large conventional grain tank within the conventional layout of a combine harvester, while still making effective use of space within the constraint of the vehicle chassis. While placing a cross auger in the middle of the grain tank can allow for a larger grain tank for a given width, it is often necessary in typical designs to use two cross augers to allow a grain tank to have the aspect ratio necessary for fitting in a typical combine geometry.

One problem with this conventional grain tank geometry is inefficient use of the volume of the grain tank relative to the available space in the combine harvester. A further problem with some of these conventional grain tank geometries is that the inlet to the unloading system is located relative to the cross auger, which is typically located in the center of the grain tank. This limitation can restrict the available length of the unload tube. Another problem with some conventional grain tank geometries is that multiple cross augers can require a more complicated vertical conveying system for extracting the grain from the grain tank.

SUMMARY

Embodiments of the present invention address and overcome one or more of the above shortcomings and drawbacks, by providing devices, systems, and methods for conveying grain along a generally flat bottom of the grain tank, allowing the bottom to be oriented at an attitude that is less than the angle of repose of the grain. This technology is particularly well-suited for, but by no means limited to, agricultural combine harvesters.

According to one embodiment of the invention, a tank for storing grain in a combine harvester comprises a plurality of sidewalls and a bottom between the sidewalls, wherein the bottom is generally flat and the orientation is such that the orientation is less than the angle of repose of the grain. A first auger is used for unloading grain from the grain tank to a discharge conveyor by conveying the grain in a first direction, and a conveyor conveys grain along the bottom in a second direction to the cross auger.

In some embodiments, the conveyance direction of the first auger and the conveyor are generally orthogonal. In some embodiments, the conveyor is an auger bed, while in others, the conveyor bed can include a belt. In some of these embodiments, the first auger and the conveyor can be operated independently.

A further aspect of some embodiments is the inclusion of a sensor in the grain tank to determine a state of the grain in the grain tank. A processor can control the conveyor in response to the detected state of the grain. In some embodiments, the sensor is positioned on one of the plurality of sidewalls such that the sensor indicates whether the level of grain in the grain tank exceeds a predetermined threshold. In some embodiments, the predetermined threshold is approximately the angle of repose of the grain.

According to another embodiment of the invention, a method allows grain to be unloaded from a grain tank. One or more sensors detect a first state of the grain in the grain tank. The method further determines if the first state of the grain in the grain tank is less than a first threshold. In response to the determination, the method operates a conveyor mechanism that conveys grain along a bottom of the grain tank to a cross auger.

In some embodiments, the method determines if the level of grain in the grain tank is less than or equal to the approximate angle of repose of the grain. In other embodiments, the method determines if the level of grain in the grain tank is less than a threshold which is greater than the angle of repose of the grain. In some embodiments, the method further includes detecting a second state of the grain and determining if the state is less than a second threshold.

In one aspect of the method for unloading the grain tank, electrical control signals are sent to a drive mechanism that drives an auger bed located along the bottom of the grain tank. A further aspect of some embodiments is that the cross auger can be operated independently from the step of determining if the state of the grain is less than a threshold value.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The above problems in the prior art have motivated the creation of the present invention. The present invention is directed to embodiments of a grain tank that conveys grain to a cross auger via an active conveying system, which may include an auger bed. Embodiments of the present invention utilize sensors to determine if the grain tank is sufficiently empty that the active conveying system should be enabled to convey grain to the cross auger.

Figure 1:
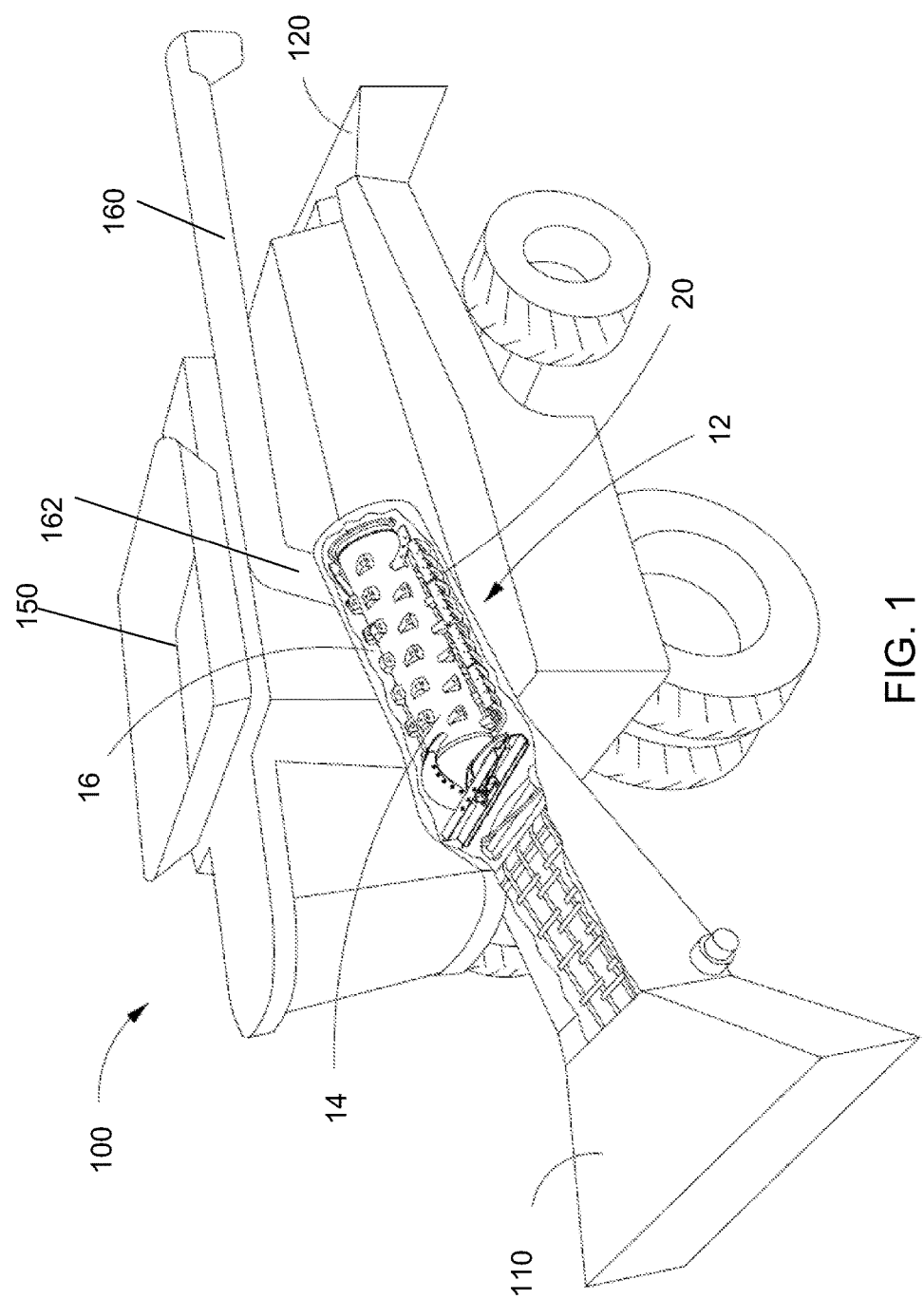
FIG. 1 is a perspective view of a harvester for use with the present invention.

FIG. 1 shows an exemplary agricultural combine 100, which may also be referred as a combine or harvester throughout this specification. As shown in FIG. 1, the combine 100 can include a longitudinally axially arranged threshing and separation system 12, and a concave 20 within the threshing and separation system 12. The threshing mechanism may also be of any well known construction and operation. In some embodiments, the concave 20 may also be used with combines having transversely aligned threshing and separation system in a combine.

As shown, threshing and separation system 12 is axially arranged, in that it includes a cylindrical threshing rotor 14 conventionally supported and rotatable in a predetermined direction about a rotational axis therethrough for conveying a flow of crop material in a helical flow path through a threshing chamber 16 extend circumferentially around the rotor 14. As shown, concaves 20 may extend circumferentially around the rotor 14 and the flow of crop may pass in the space between the spinning rotor and the concaves. As the crop material flows through the threshing and separation system 12, the crop material including, for example, grain, straw, legumes, and the like, will be loosened and separated from crop residue or MOG (material other than grain) such as, for example, husks, cobs, pods, and the like, and the separated materials may be carried away from the threshing and separation system 12 in a well known conventional manner. Crop residue can be redistributed to the field via a spreader 120, located at the back of the harvester.

The remaining threshed crop, which includes the grain to be collected, is then cleaned via a cleaning system (not shown). The cleaning system can include conventional winnowing mechanisms including a fan that blows air across a series of reciprocating sieves. Through the winnowing action of the air and the reciprocating sieves, clean grain may be collected and sorted from the remaining chaff. The clean grain may be conveyed to the grain tank 150 via a cross auger that conveys grain laterally from the bottom of the cleaning system to a vertical conveyor (or elevator) that conveys grain up a load tube to be spilled into grain tank 150. At the bottom of grain tank 150, a one or more cross augers move grain laterally from the bottom of the grain tank 150 to vertical tube 162 of unload tube 160 representing a turret style system of offloading. Vertical tube 162 may include an auger for propelling grain up and to another auger within the unload tube 160. Unload tube 160 may be rotated such that it may extend its full length laterally for unloading grain from the grain tank 150 to a support vehicle, such as a truck that is driving along the side of the combine 100. Unload tube 160 may also be oriented to the rear for storage, as shown. In a swivel style offloading system (not shown), the vertical tube 162 and unload tube 160 is replaced by an unloading auger that is attached to the one or more cross augers conveying grain from the cleaning system and may pivot from side to side from the combine 100, conveying grain from the combine 100.

Figure 2:
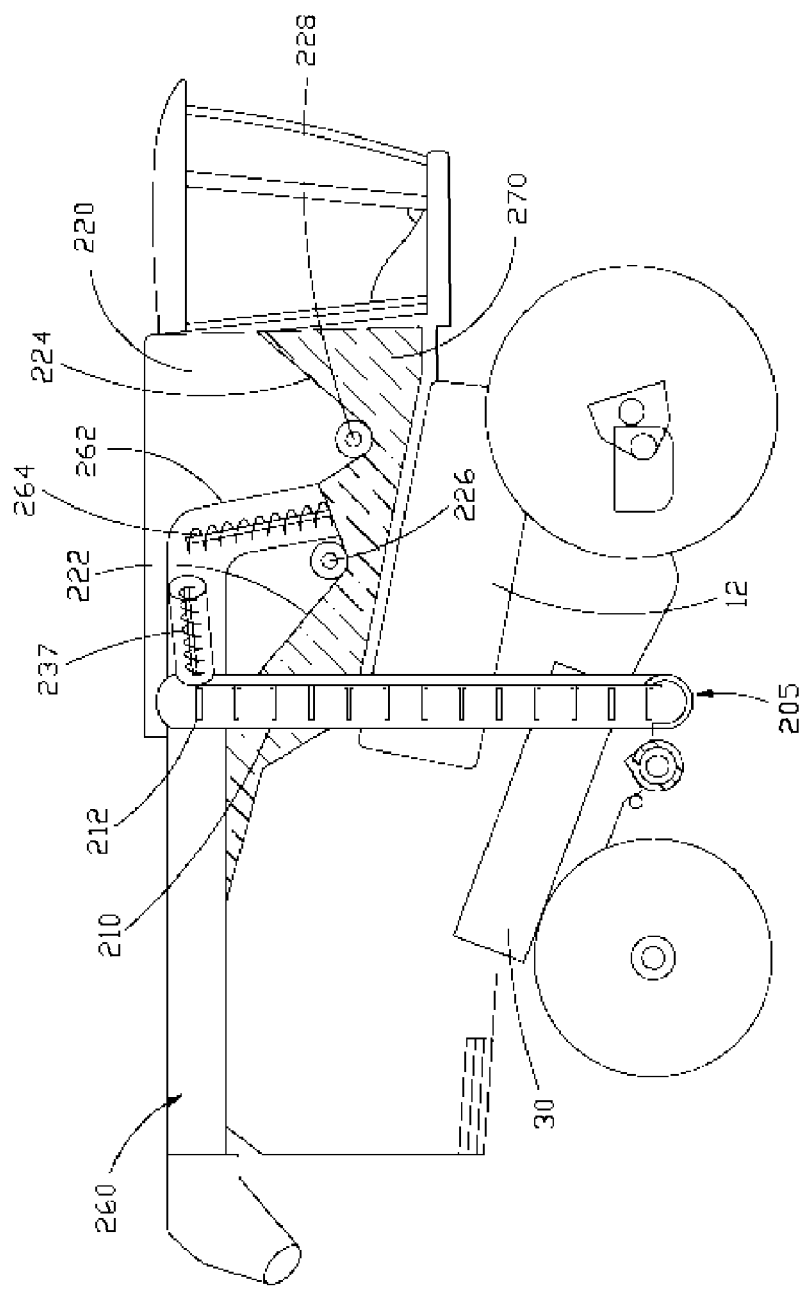
FIG. 2 is a side view of a harvester including a cutaway of a typical grain tank.

FIG. 2 shows a transparent cross-sectional view of a combine having a grain tank with an exemplary prior art geometry. Crop is threshed via threshing system 12. The threshed crop is then cleaned via the cleaning system 30. The surface in cleaning system 30 separates out clean grain which collects along the path of the bottom of the cleaning system at cross auger 205. The Clean Grain Cross auger 205 moves the clean grain laterally to an elevator 210 which includes a paddle chain lift 212. The paddle chain lift 212, wherein the paddles are uniformly spaced along the chain to lift grain, conveys the grain upward to a dispenser auger 237 that discharges the grain into the grain tank 220. In other prior art arrangements, the grain is lifted from the paddle chain lift 212 and then flipped at the top of the elevator to a sump, containing a bubble-up auger. The bubble-up auger transports grain from the sides of the grain tank 220 to the top center of the tank where the grain is discharged in the center of the tank to naturally form a cone-shape pile, wherein the angles of the sides of the cone equal the angle of repose of the grain. Other prior art arrangements implement other auger assemblies to either distribute the grain evenly along the bottom of the grain tank 220 or centrally in the middle of the grain tank 220. In this prior art arrangement of grain tank 220, sloping side walls 222 and 224 are sloped such that as grain accumulates in the grain tank 220 as conveyed from dispenser auger 237, the grain naturally slides down to cross augers 226 and 228. These side walls 222 and 224 are sloped at such an angle that they convene at the bottom of the tank 220 to form the 'W' shape floor bottom, as shown. Cross augers 226 and 228 convey the accumulated grain laterally so that it may be collected into vertical tube 262 which includes a vertical auger 264 that propels the grain upward. This allows grain to be moved into an unload vehicle via unload tube 260, which may include an internal auger and may rotate about a pivot coextensive with vertical tube 262. Non-storable grain volume 270 is identified by slash marks in FIG. 2 to show space effectively unusable between the grain tank, and the threshing system 12 due to the geometry of the sloped sides 222 and 224 forming the floor of the grain tank 220.

Figure 3:
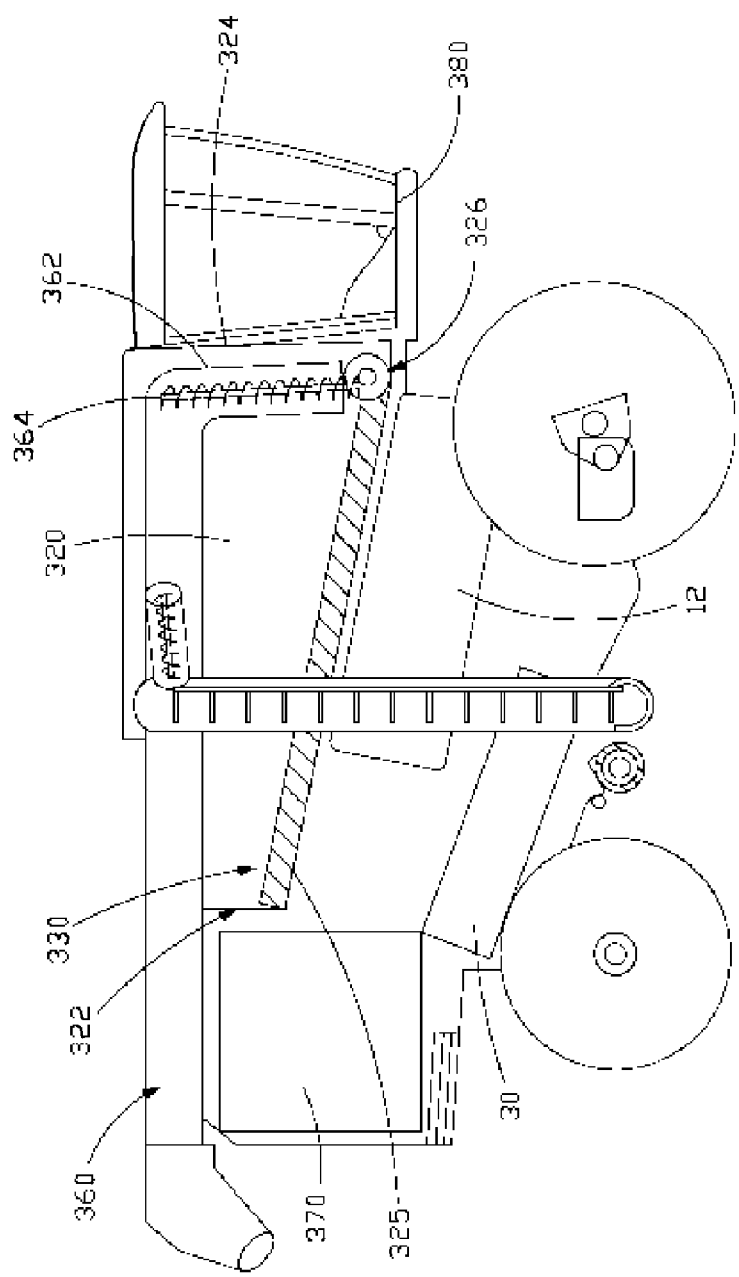
FIG. 3 is a side view of a harvester including a cut away of a typical grain tank for use with certain embodiments of the present invention.

FIG. 3 shows an improved grain tank geometry and mechanisms in accordance with embodiments of the present invention. Whereas the prior art grain tank 220 includes slope side walls 222 and 224, embodiments of grain tank 320 can include vertical side walls 322 and 324 and generally flat bottom 325, which can be oriented at a position that is less than the angle of repose of the grain. The grain tank can also include left and right sidewalls (not shown). The sidewalls and bottom can be constructed of any appropriate material available to a person of ordinary skill in the art, such as steel, aluminum or other metal, plastic, fiberglass, or the like. As can be appreciated, a more rectangular profile of grain tank 320 allows more volume of the chassis of the combine to be used for storing grain. Therefore, in some embodiments grain tank 320 is larger than prior art geometries of grain tank 220.

Along the bottom 325 of grain tank 320, a conveying system 330 is placed. Conveying system 330 allows bottom surface 325 to be less sloped than prior art floors as show in FIG. 2. Whereas prior art floors must be inclined by more than the angle of repose of the grain being collected, bottom 325 includes an active conveying system 330 such that grain tank 320 need not rely on gravity to feed grain into the cross auger. Conveying system 330 can include, in some embodiments, an auger bed, a conveyer belt or chain, an active incline, such as a reciprocating incline, or any other suitable active conveying device for conveying grain along a surface that is inclined at less than the angle of repose. Conveying system 330, in some embodiments, conveys collected grain forward in the grain tank 320 to a single cross auger 326. In some embodiments, the conveyance direction of conveying system 330 and cross auger 326 is generally orthogonal, such as for instance, fore and transverse. Cross auger 326 then conveys the grain laterally to be collected by vertical tube 362, which like prior art vertical tube 262, may include a vertical auger 364 to propel the grain upward. This sends grain into an unload tube 360, which may include another auger (not shown).

As will be appreciated, by using conveyor system 330 to convey grain to the front of the grain tank 320, cross auger 326 may be located further forward than the location of prior art cross augers. This can enable vertical tube 362 to be located further forward on the combine. This, in turn, can allow unload tube 360 to be longer than many prior art unload tubes, without extending further rearward of the combine when moved into a storage position. Thus, in some embodiments the unload tube 360 may extend further to the side of the combine once pivoted to a lateral position during operation. This can allow a support vehicle or trailer to travel further away from the combine during the harvest. Thus, in some embodiments combine 100 may using wider cutting header 110 more safely.

It will be appreciated that in some embodiments conveyor system 330 may be oriented to move grain fore, aft or in either lateral direction, depending on design considerations of a person of ordinary skill in the art. By using conveyor system 330 the designer of combine 100 can choose any orientation of grain tank 320 that would be conducive to the underlying geometry of the surrounding elements of the combine and the desired location of vertical tube 362. In the exemplary embodiment shown in FIG. 3, the geometry of surfaces 322, 324, and 325 of the grain tank 320 are chosen to make efficient use of the space between engine 370, cab 380 and threshing system 12. Ordinarily it is desirable to locate the engine in the rear to improve chassis dynamics when operating with a large cutting header.

Figure 4:
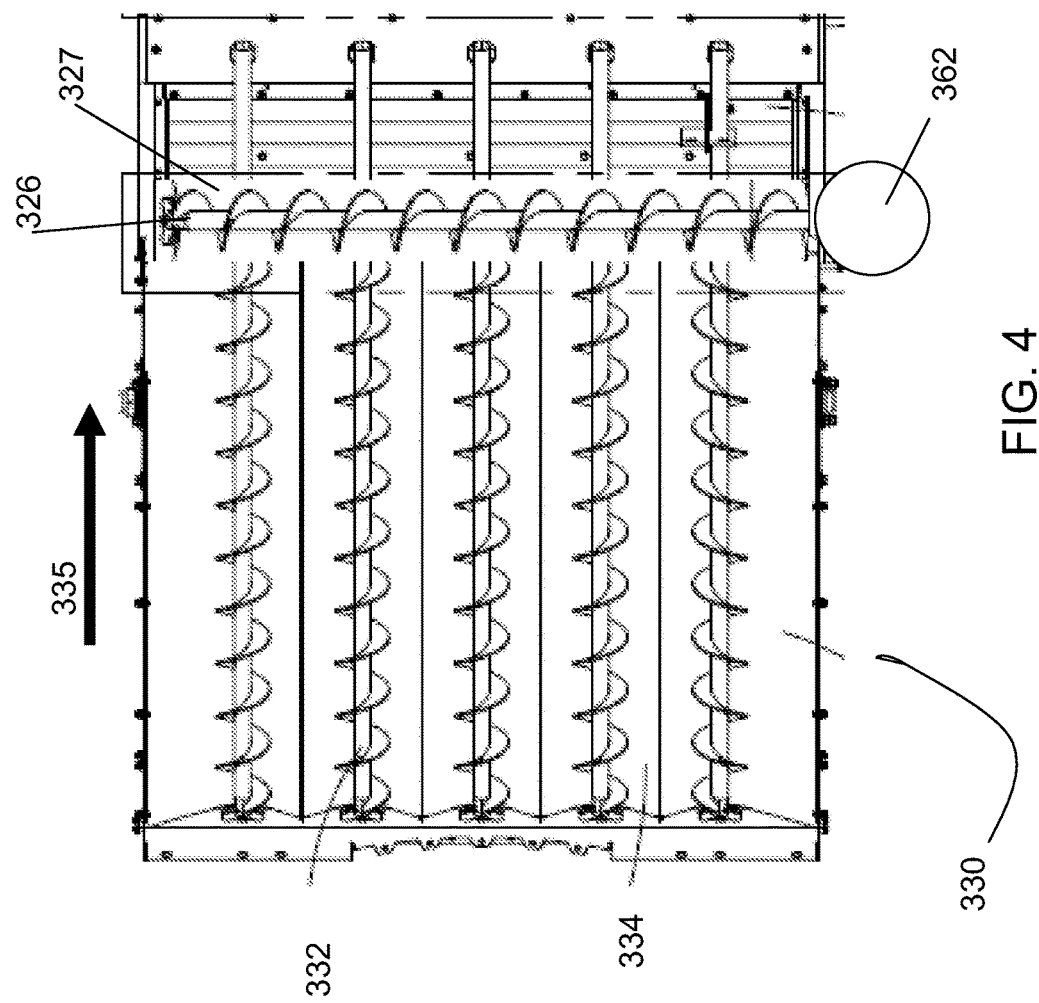
FIG. 4 is a top view of a grain tank for use with certain embodiments of the present invention.

FIG. 4 is a top view of an exemplary embodiment of conveyor system 330. This embodiment of conveyor system 330 comprises an auger bed. Augers 332 sit in troughs 334 and rotate to convey grain in direction 335. When grain reaches cross auger 326, cross auger 326 conveys the grain in a transverse direction so that it may be conveyed to a vertical tube 362. Cross auger 326 can rest in a trough 327. In some embodiments, trough 327 is located lower than troughs 334.

In some embodiments, some augers 332 in Auger bed rotate in one direction, while other augers rotate in another. In some embodiments, some of the augers 332 in the Auger bed may rotate more or less rapidly than other augers 332 in the Auger bed. In other embodiments, some augers 332 vary in size, pitch, or diameter from other augers 332 in the Auger bed. In other embodiments, some augers 332 may rotate while other augers are turned off. For instance, in some embodiments, augers may be sequenced on and off. As an example, as grain enters the conveyor system 330, the furthest auger in the Auger bed from the vertical tube 326 may turn on and move a grain pile located at the auger trough 334 to the cross auger 326 in direction 335. The next auger 332, closer to the vertical tube 362, would turn on or speed up rotation to move the pile of grain to the cross auger 326 until its grain pile is conveyed to the vertical tube 362 via cross auger 326. As the grain pile moves through the conveyor system, the furthest auger in the Auger bed from the vertical tube 326 may then be shut off when grain no longer enters the conveyor system 330 or when no piling of grain occurs on that particular auger trough 334. Subsequent augers 332 in series may also be shut off after its grain pile has been removed from the corresponding trough 334 in which the auger lies. Sequencing the augers in this manner would reduce damage to grain, wherein damage may result from piled grain on any given auger that cannot effectively be moved from that auger to the cross auger 326 and subsequently to vertical tube 362 in the conveyor system 330. More specifically, if the cross auger 326 is full in trough 327 with grain that the cross auger 326 cannot convey to the vertical tube 362, then augers 332 cannot feed the cross auger and thus continuously churns grain in its trough 334 without conveyance. This leads to grain damage along these augers 332. Sequencing of the augers 332 in an on and off manner, or adjusting various stages of power application to vary rotational speed of the augers 332, may be designed in a manner that effectively conveys the grain throughout the conveyor system 330. Sequencing the augers 332 in an on and off manner may also depend on where grain is entering the conveyor system 330. This can allow the augers to form the more uniform distribution as they convey grain in direction 335.

Traditionally, grain is conveyed in direction 335, left to right which is from the rear of the combine to the front of the combine. In some embodiments, the grain may be conveyed in a right to left direction. In other embodiments, grain may be conveyed from an outside to center direction, if for instance the cross auger 326 and vertical tube 362 were more centrally located in the conveyor system 330 or depending on other design considerations in locating the cross auger 326 and vertical tube 362. Location of the cross auger 326 or vertical tube 362 may necessitate the location of augers 332 in the Auger bed, the on and off sequencing of the augers 332, and/or the rotational speed, size, pitch, or diameter of the augers 332 to effectuate conveyance of grain through the conveyor system 330.

Augers 332 and 326 may be driven by a conventional manner known to a person of ordinary skill or, such as motors, gears, belts, chains, direct mechanical drives, and the like.

Figure 5:
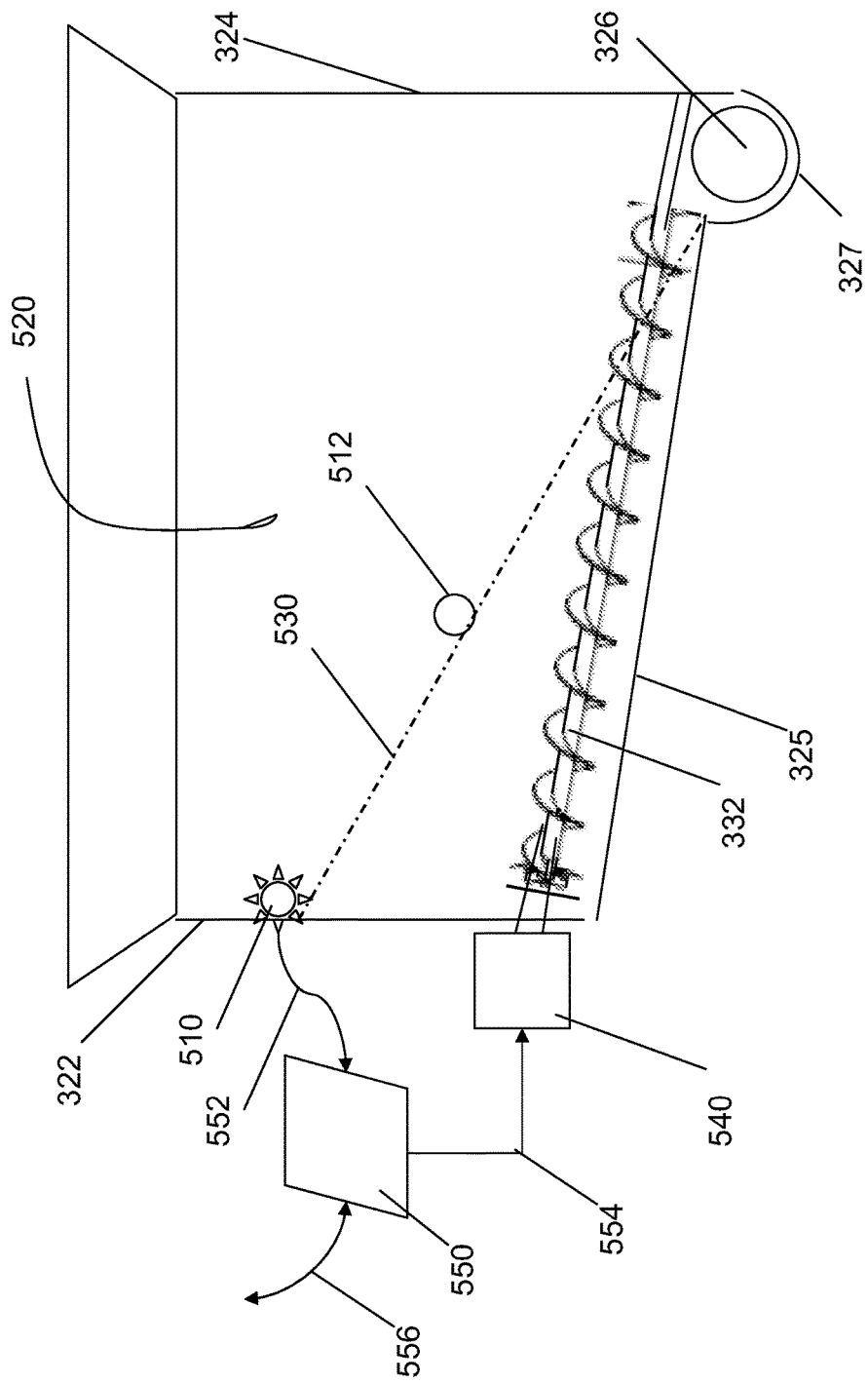
FIG. 5 is a side view of a grain tank for use with certain embodiments of the present invention.

FIG. 5 shows an exemplary embodiment of a grain tank 520, which may include one or more sensors to determine if the conveying system 330 needs to be currently operated. When grain sitting in the tank exceeds its angle of repose, such as exemplary threshold 530, grain will naturally slide to trough 327 to be transported by cross auger 326, so that the unload tube may carry the grain out of the grain tank. When the distribution of the grain exceeds angle of repose 530, auger 326 may be gravity fed, like the cross augers in prior art grain tanks. It may therefore be unnecessary to operate augers 332 or other mechanisms suitable for serving as conveying system 330 while there is sufficient grain in the grain tank 520.

However, when the grain in the tank drops below a threshold amount 530, such as an amount where the level of grain is below the angle of repose, grain may no longer feed into cross auger 326 or the rate at which grain passively enters trough 326 may be slower than desired. It may then be desirable to operate the conveyor system to feed more grain to cross auger 326. The threshold can also be set arbitrarily relative to the angle of repose, as well. For example, in some embodiments, it may be desired to use a threshold that is generally higher than the angle of repose to ensure that grain is quickly unloaded or unloaded at a generally uniform rate. In some embodiments, the threshold may be the angle of repose such that augers 332 of conveyor system 330 are only enabled when needed.

To determine whether the state of grain is above or below the threshold, one or more sensors, such as sensor 510 may be used. Sensor 510 can include any type of sensor suitable for determining the level of grain at its location or of determining the angle of the surface of the grain. Sensor 510 can include an electro-mechanical switch, a pressure sensor, an optical sensor, such as a photo diode or camera, or any other sensor that detects grain in the vicinity of the sensor. At the location of sensor 510, the presence or absence of grain would indicate whether the angle of the surface of the grain is above or below threshold 530. Additionally or alternatively, a sensor may be placed in any number of locations to determine the state of the level of grain in the grain tank, such as at location 512. The locations chosen, and the number of sensors, which may be one or more, may be chosen to suit the specific tank layout and the accuracy desired as would be apparent to one of ordinary skill in the art. It will also be appreciated that in some embodiments, multiple sensors can be used to detect multiple grain state thresholds, which could allow more complex decision logic, including for instance determining a desired speed for the augers 332, or sequentially engaging the augers in the auger bed.

In some embodiments, additional sensors can be used to detect mass flow impact, moisture in the grain, and grain type. These sensors can include an electro-mechanical switch, a pressure sensor, such as a diaphragm sensor, an optical sensor, such as a photo diode or camera, a dielectric sensor, humidity sensor, or any other sensor that may detect state of the grain. This information can be used to determine that the conveyor system 330 is needed to move more grain to cross auger 326, such as by turning on conveyors, such as augers 332, or increasing the conveyor speed.

In some embodiments, in addition to, or in alternative to, using a sensor at position 510, a sensor may be placed generally in or near trough 327 or the unload tube to determine an estimate of the amount of grain leaving auger 326. This sensor may include an electro-mechanical switch, a pressure sensor, an optical sensor, such as a photo diode or camera, an encoded rotor or impeller, a piezoelectric sensor, or any other sensor that detects an approximate amount of grain leaving the grain tank. This information can be used to determine that the conveying system 330 is needed to move more grain to cross auger 326, such as by turning on conveyors, such as augers 332, or increasing the conveyor speed.

In some embodiments, a weight sensor can be used to weigh the grain tank to determine if the weight of the grain exceeds a threshold weight, such as the weight determined to correspond to the amount of grain where state of grain level exceeds the angle of repose or other desired threshold.

The drive mechanism 540 causes the conveying system 330 to operate, such as by rotating augers 332. The drive mechanism 540 may cause each, some, or all augers 332 to rotate at varied speeds or to turn on and off at varied times. The drive mechanism 540 may include any known drive mechanism, such as motors, gears, belts, chains, direct mechanical drives, and the like. The power for drive mechanism 540 may be electrical, from the alternator of the engine of the combine or mechanical, such as receiving power from the accessory belt of the engine for the combine or via a clutch mechanism that allows a rotational connection to the engine or transmission.

Drive mechanism 540 may be controlled via operator inputs, such as switches, or via control signals from a controller 550. Controller 550 may receive inputs from sensors that sense information about the state of the grain in the grain tank 520, such as sensor(s) 510. In some embodiments, the controller may receive input about state of the grain at each or multiple auger 332 locations. Controller 550 may also receive information pertaining to each or multiple auger 332 on and off status or rotational speeds. In this embodiment, sensor(s) 510 convey information about the state of the amount and/or distribution of the grain to controller 550 via electrical signal path 552. Electrical signal path 552 can be an analog, digital or CAN bus. Controller 550 can access programming and data information from memory. This data can include information about the current configuration of the combine, user profile files, and more configuration files and/or instructions to determine how to react to sensor information. Data may also include predefined grain type crop settings stored via lookup table, database, or any alternative storage means within memory. The instructions obtained from memory may include information sufficient to make a determination regarding the desired state of the conveyor mechanism 330, such as on/off or speed based on sensor input received from sensor(s) 510.

Controller 550 can receive information about the current status of the combine configuration and parameters from any number of systems onboard the combine 100 from other controllers or devices in the combine via signal path 556. These systems may be any systems available on the combine as known in the prior art. For example, information received by the controller 550 may include information about the current status of the harvest, location of the harvester, expected time remaining as selected by a user, or any number of other inputs that may be desirable. Other systems on the combine may also report information such as the type of threshing mechanism being used, the type of crop, the current speed of the combine, whether combine is currently harvesting or not, or any other information that may be useful in addressing the decision to adjust conveying mechanism 330 as would be apparent to one having ordinary skill in the art.

Controller 550 may interact with operator of the combine via an operator display interface, which may be accessible to controller 550 via signaling bus 556. The operator interface can include a screen such as a CRT, LCD, LED, OLED, AMOLED, or other appropriate screen. The operator interface can further include input devices such as buttons, keypads, touch screens, or the like. Signal path 556 allows the controller to receive operator input or to send messages to the operator of combine.

In some embodiments, controller 550 may automatically make adjustments to the state of the conveyor system 330 by controlling the drive mechanism 540 via signal path 554. The signals received via path 554 may control actuators or other electrically adjustable mechanical drives including motors, electro mechanical devices, hydraulically or pneumatically actuated systems, or the like. Adjustments can include turning on or off the mechanism and in some embodiments, controlling the speed of the conveying system 330. In some embodiments, adjustments include turning on or off each auger or controlling the speed of each auger in the conveyor system 330.

In some embodiments, controller 550 will not automatically make adjustments to the drive mechanism 540. In some embodiments, the controller 550 may convey sensor information to the operator and await instruction or allow the operator to directly operate drive mechanism 540. In some embodiments, controller 550 will inform the operator of a recommended state for the drive mechanism 540 and await operator confirmation.

In some embodiments, digital signal or analog signals or signals that comply with any desired standard can be used for signaling paths 552, 554, and 556. In some embodiments, CAN signals are used to take advantage of existing CAN busses in the harvester 100. This also allows the controller 550, drive mechanism 540, and sensor(s) 510 to be integrated with other systems onboard the harvester 100 and allows simple standards-based electronic control. It should be noted that not all signaling paths 552, 554, and 556 need to be unidirectional or bidirectional in all embodiments.

Controller 550 can be one or more microcomputer, microcontroller, or processor including appropriate peripherals such as memory, power source, data buses, and other circuitry appropriate for carrying out its controller functionality. Controller 550 can use memory to store data (e.g. saved settings, recorded status information, configuration files, user profiles, etc) or instructions (e.g. applications, algorithms, or programs used in the operation of the present invention) for use during operation of conveyor system 330. Memory accessible to controller 550 can be a local RAM, ROM, flash memory, hard drive, solid state storage, removable memory, or any combination or subset thereof.

Controller 550 can be a single unit that is used for multiple systems within harvester 100, besides the conveyor system 330. For example, controller 550 may be part of a larger electronic control circuit that may be responsible for ignition systems, driving systems, harvesting systems, entertainment systems, climate-control systems, or a number of other systems that maybe used in harvester 100.

Figure 6:
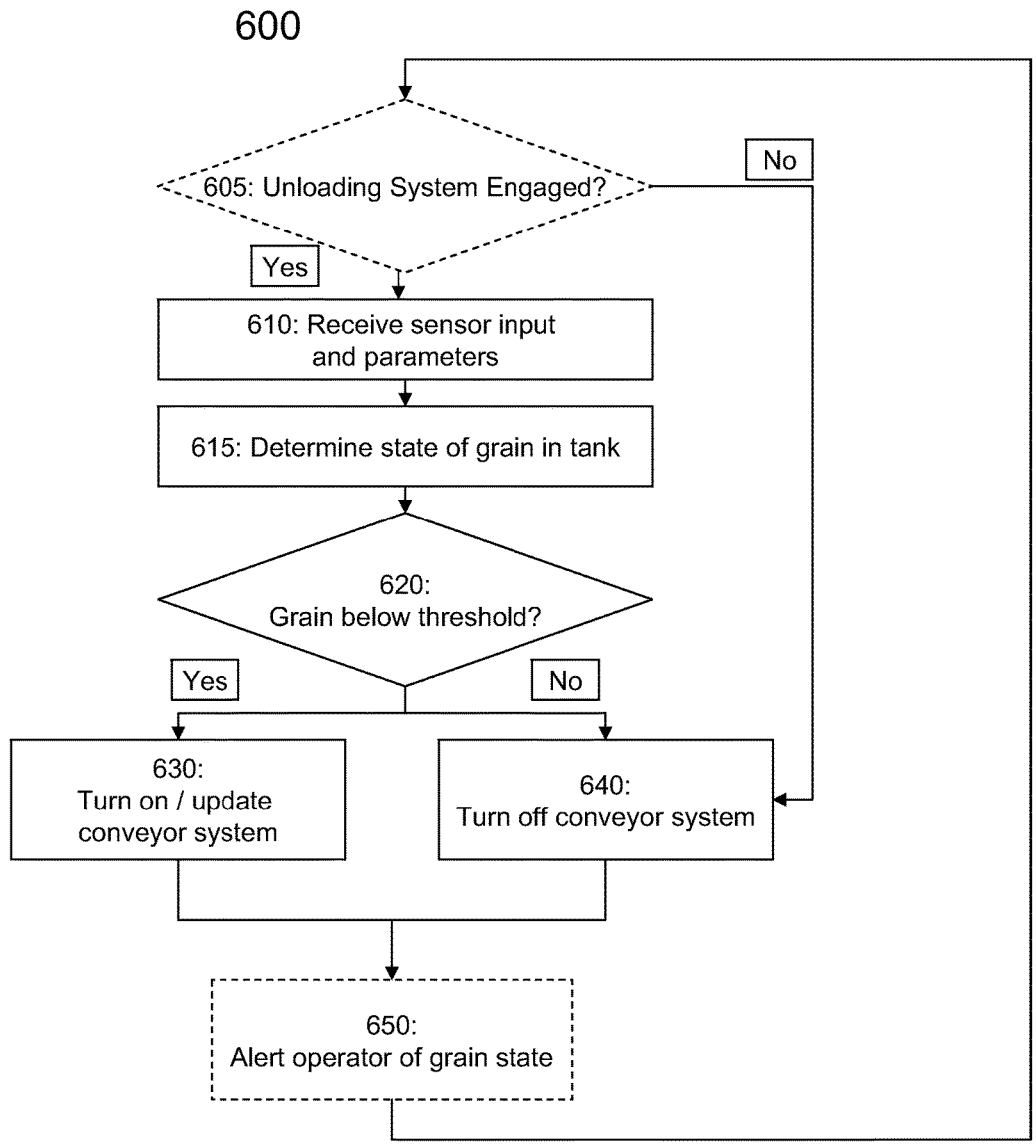
FIG. 6 is an exemplary flow diagram for an embodiment of the operation of a grain tank.

FIG. 6 shows a logic flow diagram for the control logic that may be used by controller 550 when operating conveyor system 330. Loop 600 begins at step 610, where controller 550 receives sensor input from one or more sensors that can be used to determine the current state of the level of grain in grain tank 520, including for instance the orientation of the level relative to the angle of repose. At step 610, controller 550 can also gather any parameters that may be stored in memory, such as operator preferences, as well as check the state of any other signals that inform the controller of the state of the combine, such as signals indicating whether the cutting header is operating and whether cross auger 326 is operating to unload grain.

At step 615, controller 550 determines from the sensor data at least one current state of the level of the grain, such as whether the grain level is above or below sensor 510, or the speed at which grain is entering or leaving trough 327.

At step 620, controller 550 can compare the current state to one or more thresholds to prepare the current state for use with decision logic. The result of the threshold comparison can sort the current state into one of any expected states that the decision logic can handle, such as whether the grain is below the angle or repose or above the angle or repose, but exiting the grain tank at less than a desired rate. At step 620, the controller 550 further compares the state information or result of the state threshold determination to decision logic to determine whether to change the current state of the drive mechanism 540 to be updated or whether it needs to be changed to respond to the current state of the grain level. At step 620, controller 550 can take into account any additional parameters, such as user preferences or the state of other systems on the combine. Exemplary logic includes determining that the conveyor system should be operated when the grain level is below threshold level and/or determining the desired speed of the conveyer system based on the speed of grain leaving the tank. As a result of the decision logic at 620, controller 550 sends control signals to drive mechanism 540 in accordance with the decision logic.

For example, if the result of step 620 is an indication that the drive mechanism should be turned on, at step 630, controller 550 sends signals to turn on the drive mechanism 540 and/or sets the speed of the drive mechanism. Alternatively, if the current state of the drive mechanism is already set to the desired state, at step 630, the controller 550 can be programmed to send no signals.

If the result of step 620 is an indication that the drive mechanism should be turned off, at step 640, controller 550 sends signals to turn off the drive mechanism 540. Alternatively, if the current state of the drive mechanism is already set to the desired state, at step 640, the controller 550 can be programmed to send no signals.

In addition, method 600 can include a step 605, occurring before step 610, where the controller 550 can determine whether the unloading system is engaged. An engaged loading system signifies that grain is being collected by the vertical auger 264 within the vertical tube 262 via the cross auger 326. In some embodiments the controller 550 can determine the amount unloaded and the effectiveness of unload based on inputs from sensors located at or near cross auger 326 and/or trough 327. If the controller 550 determines that the unloading system is engaged, then step 610 is conducted as described above followed by those steps defined in loop 600. If the controller 550 determines that the unloading system is not engaged then step 640 is conducted, in which the drive mechanism 540 and the remainder of loop 600 is processed as described above.

In addition, method 600 can include a step 650 where the operator is alerted of the status change of the drive mechanism 540 for the conveying mechanism 330 and/or the detected state of the grain. Step 650 can also include requesting permission to change the state of the conveyor system 330 or alerting the operator that he should make a manual change to the state of the conveyor system, such as manually turning the conveyor system on or updating the speed of the conveyor. Step 650 can be placed anywhere in loop 600 as desired.

Loop 600 can be a loop that is performed at a regular interval and polls sensors at 610, or may be an interrupt routine that only runs when controller receives signals indicating a change in the sensor state or change in the status of the combine.

In some embodiments, loop 600 may represent the control logic when controller 550 sends signals to the drive mechanism 540 to turn on or off or alternate the rotating speed of a single auger 332 within the conveyor system 330. In this embodiment, controller 550 will determine from sensors located at the auger, the state of the grain in step 610. The controller will then determine the state of the grain at the location of the auger in step 615 and determine the threshold of the grain at the auger in step 620. Based on this determination, the controller will turn on the auger in step 630 or turn off the auger in step 640. Thus loop 600 may be implemented for every auger in the conveyor system 330, such that the augers might be turned on and off concurrently, sequentially, or randomly and/or rotated at concurrent or various speeds in operation of the conveyor system 330. For instance, in one embodiment, loop 600 may be implemented for each auger to generate sequential turning on or off of the augers 332 to effectively move grain in the direction of the cross auger 326 and ultimately to the vertical tube 362. In this and other embodiments, the controller may determine state of grain at varied auger locations and whether other augers 332 in the Auger bed controlled in concurrent, previous, or subsequent control logic under loop 600 were turned on or off or whether rotational speed was altered.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A tank having a forward and rearward end for storing grain in a combine harvester having a forward and rearward end direction, said tank comprising:
    a plurality of vertical sidewalls that form an interior of the tank, each of the plurality of sidewalls extending vertically starting from a bottom surface of the tank to a top of the tank;
    the bottom surface positioned between the plurality of sidewalls;
    an unloading auger that unloads grain from the grain tank along the bottom surface to a discharge auger, by conveying grain in a first direction;
    a conveyor that conveys grain along the bottom surface to the unloading auger in a second direction relative to said first auger, said bottom surface being inclined so that said unloading auger is lower than said conveyer;
    a programmed controller connected to at least one sensor and operatively connected to a drive mechanism of the conveyor for controlling the operation of the conveyor;
    the at least one sensor configured to detect a state of grain in at least a portion of the grain tank and transmit a signal representative of the state of grain to the programmed controller, wherein the state of grain sensed is representative of at least one of a level and amount of grain in at least a portion of the grain tank, wherein the programmed controller is configured to compare the state of grain to a predetermined threshold value and to control the drive mechanism to at least one of initiate movement or increase speed of movement of the conveyer in a direction to transfer the grain toward the unloading auger when the programmed controller determines the sensed state of grain is below the predetermined threshold.

2. The tank of claim 1, wherein the first and second directions are generally orthogonal.

3. The tank of claim 1, wherein the conveyor comprises an auger bed.

4. The tank of claim 1, wherein the conveyor comprises a conveyor belt.

5. The tank of claim 1, wherein the first direction of said first auger is oriented transverse relative to the forward and rearward end direction of said combine harvester.

6. The tank of claim 5, wherein the direction of said conveyor is oriented in the forward end and rearward end direction of the combine harvester.

7. The tank of claim 6, wherein said first auger is at the forward end of said tank relative to the combine harvester.

8. The tank of claim 1 in combination with a harvester wherein the tank is positioned on the body of the harvester and positioned to store harvested grain.

9. The tank of claim 1, wherein the at least one sensor comprises a first and second sensor located in respective first and second portions of the tank and the conveyor comprises at least a first and second auger located respectively in the first and second portions of the tank, wherein the controller and drive mechanisms are configured to control operation of first auger dependent on a signal from the first sensor of the state of grain in the first portion and to control operation of the second auger dependent upon the state of grain detected in the second portion of the tank such that the augers can be operated at least one of concurrently, sequentially and independently at concurrently or varying speeds.

10. A harvester comprising:
a tank having a forward and rearward end for storing grain,
said tank comprising:
    a plurality of vertical sidewalls that form an interior of the tank, each of the plurality of sidewalls extending vertically starting from a bottom surface of the tank to a top of the tank;
    the bottom surface positioned between the plurality of sidewalls;
an unloading auger that unloads grain from the grain tank along the bottom surface to a discharge auger, by conveying grain in a first direction;
a conveyor controlled by a drive mechanism that conveys grain along the bottom surface to the first auger in a second direction relative to said unloading, said bottom surface being inclined so that said unloading auger is lower than said conveyor;
a programmed controller operatively connected to the drive mechanism and configured for controlling the conveyor in response to a state of the grain in the grain tank;
a sensor connected to the programmed controller, the sensor configured to detect the state of the grain in the grain tank, wherein the programmed controller is configured to receive a signal from the sensor representative of the state of grain in the tank and if the programmed controller determines from the signal that a level or an amount of grain in the grain tank is below a predetermined threshold the programmed controller controls the drive mechanism of the conveyer to initiate or increase the speed of the conveyer to move grain toward the auger.

* * * * *